Feb. 9, 1954     B. H. DALTON     2,668,682
FOLDING TRIPOD CONSTRUCTION
Filed Aug. 22, 1949     2 Sheets-Sheet 1
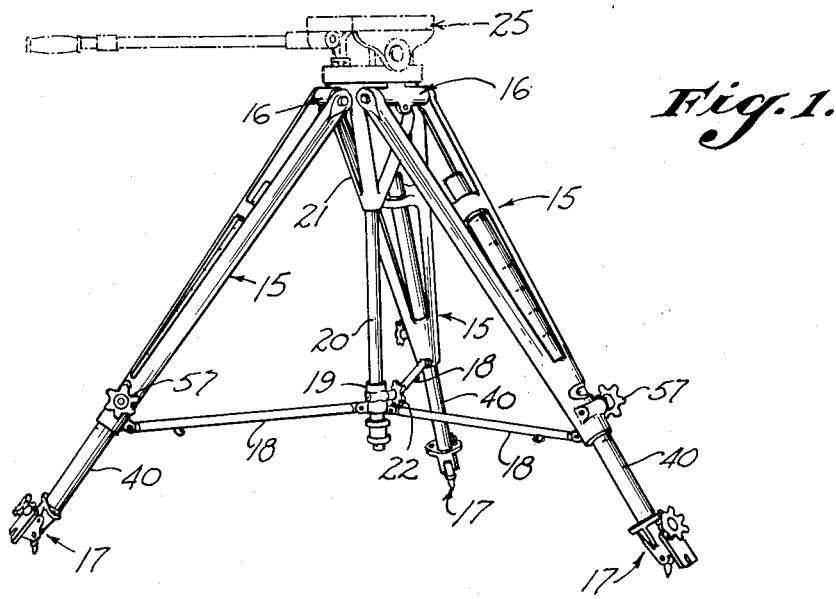
Fig. 1.
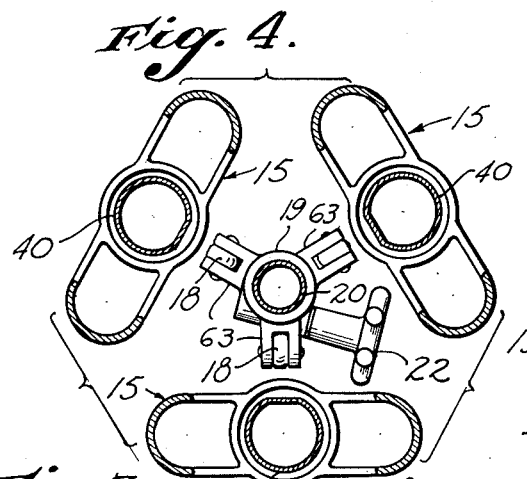
Fig. 4.
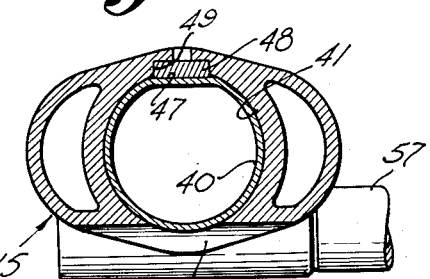
Fig. 6.
Fig. 5.
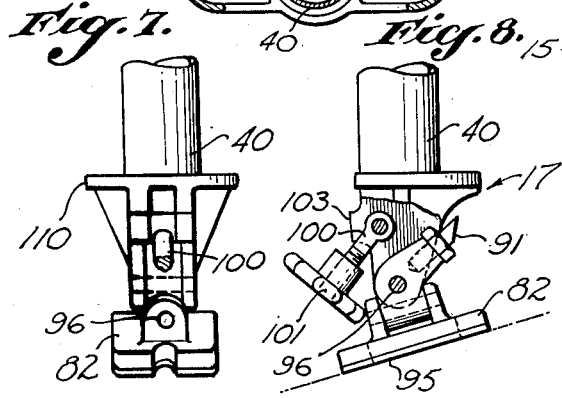
Fig. 7.    Fig. 8.
BRUCE H. DALTON
INVENTOR.
BY
ATTORNEY.

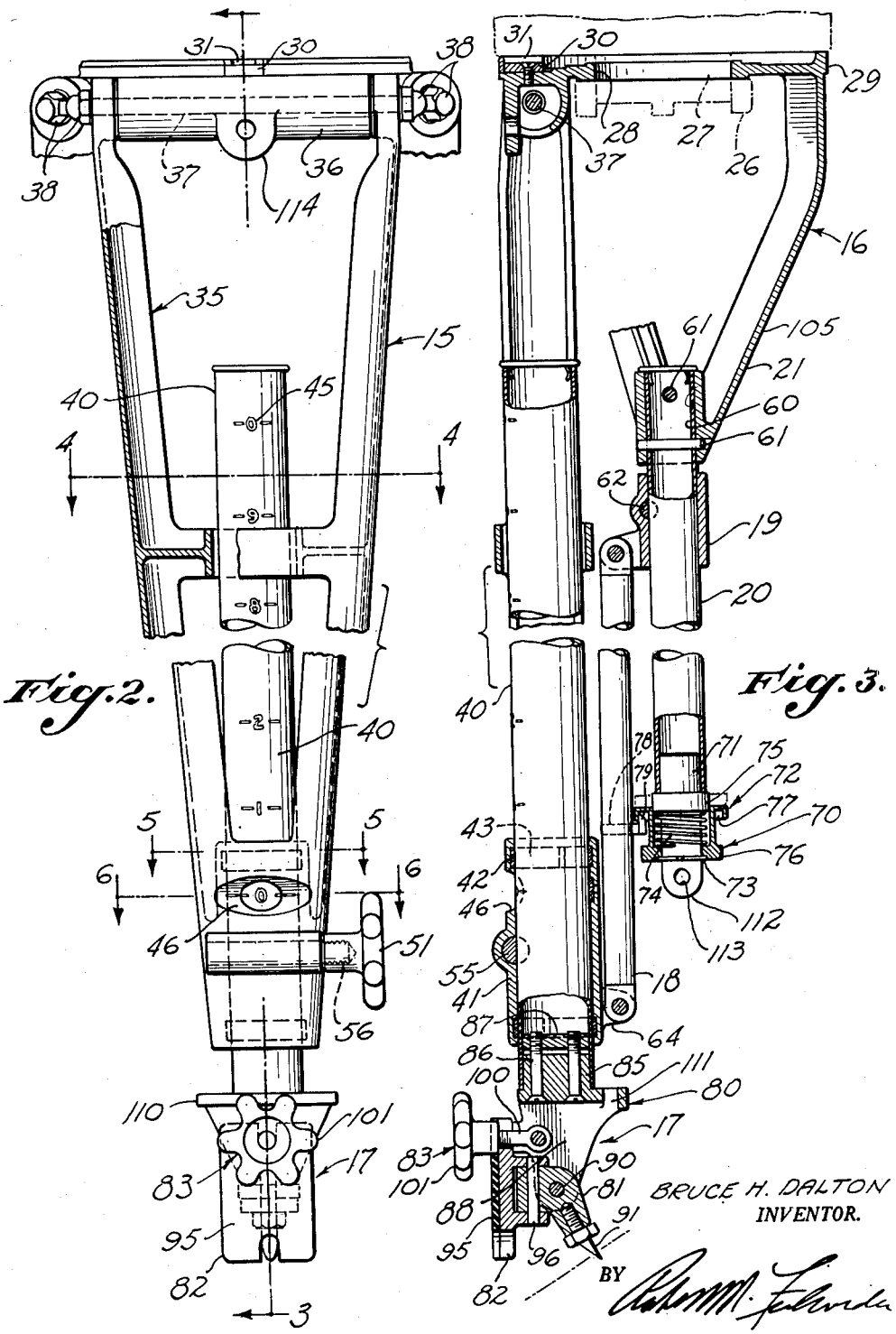

Patented Feb. 9, 1954

2,668,682

UNITED STATES PATENT OFFICE 2,668,682

FOLDING TRIPOD CONSTRUCTION

Bruce H. Dalton, Los Angeles, Calif., assignor, by mesne assignments, to Houston-Fearless Corporation, a corporation of California Application August 22, 1949, Serial No. 111,593

15 Claims. (Cl. 248—169)

My invention relates generally to supports for motion picture cameras, television cameras, directional antennas, optical instruments, and the like. More particularly, my invention relates to a folding tripod especially suited for use with television cameras.

A camera tripod, especially suited for the purpose last above mentioned, should preferably be of such construction as to be light enough to be readily portable, yet must be a substantially motionless, vibrationless base for the camera. It is also highly desirable that the tripod be foldable so that it may be quickly and easily transported from one place to another.

Still further, the construction should be such that the operator may quickly adjust the same to suit various conditions of use, without the necessity of a large number of small catches, latches, or thumb screws.

Bearing in mind the general desiderata above mentioned, it is one object of my invention to provide a tripod of the class above described of light and rigid construction and having adjustable feet by which the device may be adapted for use either on a flat interior floor such as a hardwood or marble floor, or alternatively, can be adjusted for use on rough ground.

It is another object of my invention to provide a foot construction for tripods which incorporates a universal joint, thus allowing the foot to accommodate itself to different angular adjustments of the tripod or uneven ground.

A further object of the invention is to provide in an adjustable foot of the nature above stated means to present either a flat support surface for use on floors, or a retractable spur which may be thrust into the ground when the tripod is used out-of-doors.

An additional object of the invention is to provide a linkage system for rigidly interconnecting the three legs of a tripod when the same is in an expanded position for use.

A still further object of the invention is to provide a latch mechanism for simultaneously latching the tripod legs in a closed position when the device is folded for transportation.

Still another object is to provide a tripod construction in which the under side of the head is readily accessible for the purpose of attaching or detaching tilt heads and other objects on the top of the tripod.

The foregoing and additional objects and advantages of the invention will be apparent from consideration of the following detailed description thereof, such consideration being given likewise to the attached drawings, in which:

Figure 1 is a perspective view of the tripod in unfolded position ready for use and with the feet adjusted for use in rough ground;

Figure 2 is an elevational partially sectioned fragmentary view taken in the plane of one of the legs and with the tripod shown in folded condition ready for transportation;

Figure 3 is an elevational section taken on the line 3—3 in Figure 2;

Figure 4 is a horizontal section taken on the line 4—4 in Figure 2;

Figure 5 is a horizontal section taken through one leg along the line 5—5 in Figure 2;

Figure 6 is a horizontal section taken through one leg on the line 6—6 in Figure 2;

Figure 7 is a partial front elevational view of one of the tripod feet adjusted to a condition for interior use; and Figure 8 is a side elevational view of the portion shown in Figure 7.

Referring first to Figure 1, it will be seen that the tripod embodying this invention includes three leg assemblies, indicated generally by the reference character 15, the leg assemblies being hingedly secured at their upper ends to a common central body 16 and each having a foot assembly 17 at the lower end. The leg assemblies 15 are additionally supported by three divergent struts 18, each pivotally secured at an outer end to one of the leg structures, and at the inner end to a central clamp member 19 which is vertically slidable on a central post 20. The central post 20 is, in turn, supported in the body 16 on a downardly projecting spider portion 21, the nature and purpose of which will be described in more detail hereinafter.

The struts 18 are shown in a substantially horizontal position in Figure 1, but may assume a more or less inclined position depending on the adjusted position of the clamp 19 along the central post 20. The struts 18 being of a fixed length, adjustment of the clamp member 19 upwardly or downwardly along the post 20 draws the leg assemblies 15 inwardly or projects them outwardly so as to converge or diverge the legs to change the relative spread of the three assemblies. A clamp, having a fluted hand knob 22, is provided for the purpose of securing the clamp member 19 at any desired position along the post 20. The interconnection of the leg assemblies in the manner just described coordinates the movement of the leg assemblies so that they assume, at all times, an equal angular disposition with respect to the center post 20.

A tilt head 25, indicated in phantom line in Figure 1, and in Figure 3, is shown secured to the top of the central body 16. Such a tilt head or other similar mechanism may be secured to a horizontal platform portion of the tripod body by means of a relatively large hand nut 26 located underneath the top of the body as shown in Figure 3. Each piece of equipment intended to be secured to the top of the body 16 is provided with a downwardly projecting, exteriorly threaded boss 27 which projects through an aperture 28 in the platform and receives the hand nut 26. Such apparatus rests on a peripheral seat 29 at the top surface of the body 16, and an insert 30 having a keyway 31 therein is secured at a predetermined point in the seat 29 in order to uniformly align any equipment secured to the tripod, such equipment having an appropriately positioned key in the base thereof.

Having described the principal components of the tripod, the individual assemblies will now be described. For a discussion of the leg assemblies 15, particular reference should now be made to Figures 2 and 3.

Each of the leg assemblies 15 comprises an inverted A-frame casting 35, and a tubular leg 40 clamped at the lower end of the A-frame 35. The upper ends of the A-frames straddle an elongated cylindrical boss 36 projecting from the body 16. A through-rod 37 having an acorn nut 38 threaded to each end provides the pivotal connection between the A-frame 35 and the body 16. Thus, it is seen that the legs swing inwardly or outwardly in three mutually intersecting planes disposed at 120° to each other.

Each leg 40 is slidably supported for telescoping movement in the lower end of the A-frame 35, a tubular bore 41 being provided in the lower end of the latter member, the diameter of such bore being slightly larger than the external diameter of the leg 40. Adjacent the upper and lower ends of the bore 41 are formed counterbored recesses 42, each of which receives a split bearing ring 43, the dimension of the latter being such as to provide a relatively close sliding fit with the leg 40. Thus, the A-frame 35 may be cast of a relatively light material such as aluminum or magnesium, while the wear and corrosion resistance necessary to effect a fine sliding fit is provided by reason of the bearing ring 43.

In adjusting the tripod for use, the leg assemblies 15 are first spread apart and the legs 40 are then extended in telescope fashion to provide the desired height of the tripod. In many instances, it is desired to use the tripod in vertical position on a level surface in which case each of the legs 40 should be extended by the same amount. To this end, a numerical scale comprising engraved or printed numbers 45 is provided on each of the legs 40. An index window through which the scale numbers 45 may be read is formed in the A-frame 35 adjacent the bore 41, as indicated by the reference character 46.

In order that the scale numbers 45 will always be positioned under the window and further, for proper operation of the foot assemblies 17, as will be hereinafter described, it is necessary that the legs 40 be prevented from rotating in the bore 41 while still being freely slidable therein. To this end, each of the legs 40 is formed with a longitudinal flat 47 along the rear surface thereof, and a flat disc-shaped key 48 is supported within the bore 41 in alignment with the flat 47 whereby to prevent rotation of the legs 40. The key 48 is positioned in a small circular socket or seat 49 which is formed in the interior of the bore 41 with a counterboring tool inserted through the index window 46.

When the legs 40 have been extended by the desired amount, they may be clamped in such position by means of a clamp rod 55 extending transversely across the lower end of the A-frame 35 and partially intersecting the bore 41. The clamp rod 55 is exteriorly threaded at one end as indicated by the reference character 56 in Figure 2, and a fluted hand knob 57 is threaded onto the end of the rod 55. The rod 55 has an arcuate portion thereof cut away intermediate the ends thereof, which arcuate portion partially embraces the leg 40 so that when the hand knob 57 is tightened on the rod 55, the latter is moved axially to bind and clamp the leg 40 in its then position.

Turning now to a discussion of the means for bracing the leg assemblies 15 in any position thereof, and also to means for locking the leg assemblies 15 in a folded position, reference is made particularly to Figure 3. The center post 20 is secured at its upper end in the spider 21 in a closely fitting bore or socket 60 formed in the lower end of the latter, and a pair of drive pins 61 are inserted to further secure the center post 20 in place. The clamping member 19 is provided with a clamp rod 62 similar in nature to the leg clamp rod 55, one end of the clamp rod 62 carrying the hand knob 22.

The clamping member 19 is formed with three clevis-like projections 63 (see Figure 4), each of which receives an end of one of the struts 18 for pivotal connection thereto. A similar clevis-like projection 64 is formed at the lower end of each A-frame 35 adjacent the inner side thereof whereby to attach the outer end of each strut 18 to one of the leg assemblies 15.

As has been previously stated, the spread of the leg assemblies 15 depends on the position of the clamp member 19 along the rod 20. When this clamp member is located as shown in Figure 3, i. e., at its uppermost position along the rod 20, the struts 18 assume a position substantially parallel to the leg assemblies 15, the latter being then in completely folded position ready for transportation.

It is desirable that the legs be retained in such folded position during transportation, and to this end, a lock structure, indicated generally by the reference character 70, is mounted on the lower end of the center post 20. The lock assembly 70 includes a stud 71 pressed and brazed into the lower end of the center post 20 (the latter being of tubular construction), a lock ring 72 slidably carried on the stud 71 and retained thereon by a snap ring 73, and a compression spring 74 surrounding the stud 71 and contained within the lock ring 72. The compression spring 74 is anchored at its upper end against a shoulder 75 formed on the stud 71, and at its lower end against an internal shoulder 76 in the lock ring 72. Thus, the lock ring 72 is normally thrust downwardly against the retaining ring 73.

Adjacent the upper end of the lock ring 72 is formed an annular, downwardly facing recess 77, the purpose of which is to catch and retain the heads of three latch bolts 78, one of which is secured in each of the struts 18 and has a tapered head 79 positioned and adapted to enter the recess 77. It will be seen that, by reason of the sloping forward surface on the bolt head 79, the latter when moved inwardly toward the latch ring 72 engages the same and moves it upwardly against the urging of the compression spring 74.

Thereafter, when the bolt head 79 passes the rim of the annular recess 77, the latch ring 72 is moved downwardly by the spring 74 to engage and hold the three latch bolts, thus holding the struts 18 and the leg assemblies 15 in folded position. In the presently illustrated embodiment, the latch bolts 78, when engaged with the rings 72, serve to hold the legs against outward swinging movement since the legs and bolts are interconnected by the struts 18. Various modifications will appear from the above arrangement, for example, at a point just below the hinge of the strut 18, the bolts 78 may be connected directly to the legs 15, and will, with a slight lengthening of the post 20, engage and be held by the rings 72 in exactly the same manner as above described.

When it is desired to release the lock assembly 70 in order to unfold the tripod, one has merely to press upwardly on the ring 72, thus simultaneously releasing the three bolts 78 and permitting the legs to be swung outwardly.

Turning now to a description of the foot assemblies 17, reference should be had to Figures 2, 3, 7 and 8. Each foot assembly comprises a yoke casting 80, a spur member 81, a pad member 82, and a lock screw assembly 83.

A yoke member 80 is mounted to the bottom end of each leg 40, being positioned therein by a cylindrical boss 85 received in the tubular leg and secured therein by two set screws 86 threaded into a plug 87 welded or brazed into the interior of the leg 40.

The yoke member 80 is formed with a pair of downwardly extended arms 88, between the lower ends of which the spur member 81 having a removable spur 91 is pivotally mounted on a pivot rod 90 for swinging movement in a plane substantially perpendicular to the plane of the A-frame 35. Thus, the spur member 81 may be swung about its pivot rod 90 selectively into the position shown in Figure 3 in which the spur 91 projects downwardly to engage the ground surface, or into the position shown in Figure 8 wherein the spur is in a substantially retracted position and the pad member 82 engages the ground or other supporting surface. The pad member 82 is provided with a friction pad 95, cemented or otherwise secured to its bottom surface to prevent the structure from slipping when supported on a polished floor or other smooth surface.

In many instances, it is desirable to so adjust the extension of the legs 40 so that the entire tripod structure assumes a tilted position. In such cases, it is necessary that each of the pad members 82 have at least two degrees of pivotal freedom in order that it may remain in flat contact with the supporting surface. To this end, the pad member 82, instead of being mounted directly to the yoke member 80, is mounted to the spur member 81 by a pivot rod 96 disposed substantially at right angles to the spur pivot rod 90. Thus, the pad member 82 may swing in the same plane as does the A-frame 35 by reason of the spur pivot pin 90, and may rock in a plane perpendicular thereto by reason of the pad pivot pin 96.

It is a further necessity to the use of the spur 91 that the same be rigid with respect to the leg 40, otherwise a lateral force applied to the tripod would cause the spur to tilt about the pivot pin 90, thus making the support unstable. For this purpose, a lock screw assembly 83 is provided on each of the foot assemblies 17. The lock assembly 83 comprises an eye bolt 100 pivotally carried between two arms 88 of the yoke member 80, and a fluted hand knob 101 threaded onto the bolt 100. Each of the pad members 82 and the pad 95 secured thereto is notched at its upper end so that the eye bolts 100 may be rocked downwardly into the notch and the hand knob 101 tightened so as to pull the pad member 82 into tight engagement with a pair of abutments 103 formed in the yoke member 80, as may be best seen in Figure 8. When the pad is secured in this manner, the spur 91 forms a rigid extension of the leg 40.

Among the advantages of the present construction is that various pieces of apparatus may be quickly attached or detached from the top of the body 16. Such ease of operation is provided by the fact that the spider member 21 is formed with three downwardly converging struts 105 integrally cast with the body 16, and the spaces between the struts 105 are such that the operator's hand may be completely inserted through one of the A-frames 35 and between the struts 105 to reach the hand nut 26.

When the tripod described herein is used in windy locations, on shipboard, on the tops of moving vehicles, in aircraft, or in other places where it is liable to be upset, it is desirable to positively secure the tripod to the supporting surface. For this purpose, several fastening means are provided in the present structure. Each of the yoke members 80 in the foot assembly 17 is flanged, as indicated by the reference character 110, and the flange is formed with slots as, for example, at 111, whereby each foot assembly 17 may be secured to the supporting surface by a strap or other fastening means.

Similar means for securing the assembly to a supporting surface is provided at the lower end of the center post 20 in the form of a tongue 112, formed in the lower end of the stud 71 and having an opening 113 therein to which a rope tie or other fastening means may be secured. Similar perforated tongues 114 are formed in the lateral bosses 36.

While the form of the device shown and described herein is fully capable of achieving the objects and providing the advantages hereinbefore stated, it will be realized by those skilled in the art that it is capable of some modification without departure from the spirit of the invention. For this reason, I do not mean to be limited to the form shown and described but rather to the scope of the appended claims.

I claim:

1. In a support structure of the class having a plurality of legs secured together at their upper ends, a foot structure for each of said legs comprising: a member having a ground-engaging spur secured therein, said member being pivotally secured to the lower extremity of said leg for swinging movement in the vertical plane of said leg between retracted and ground-engaging positions; and a pad having a flat ground-engaging surface pivotally secured to said member for swinging movement in a plane intersecting said first plane, the relative position of said spur and pad being such that one is always in retracted position when the other is in ground-engaging position.

2. In a support structure of the class having a plurality of legs secured together at their upper ends, a foot structure for each of said legs comprising: a member having a ground-engaging spur secured therein, said member being pivotally secured to the lower extremity of said leg for swinging movement in the vertical plane of said leg between retracted and ground-engaging positions; a pad secured to said member, said pad having a flat ground-engaging surface and the relative position of said spur and pad being such that one is always in retracted position when the other is in ground-engaging position; and means to lock said member rigidly to said leg to prevent said swinging movement with said spur thereof in ground-engaging position.

3. In a tripod having inclined legs secured together at the upper ends thereof, a foot structure for each leg comprising: a first pivot mounted adjacent the lower end of said leg, said first pivot being substantially perpendicular to a vertical plane through said leg; a member having a ground-engaging spur therein and being mounted on said first pivot for swinging movement thereon to retract said spur or extend the same into ground-engaging position, said member having a second pivot mounted therein substantially perpendicular to said first pivot; and a pad having a flat ground-engaging surface mounted on said second pivot for limited lateral tilting movement with respect to said member, the relative position of said spur and pad being such that one is always in retracted position when the other is in a ground-engaging position.

4. The construction of claim 3 further characterized by having means in said leg including a clamp member positioned and adapted to engage said pad to lock the same rigidly against said leg with said spur in ground-engaging position.

5. In a foldable support of the class having a central body and a plurality of legs hinged thereto at their upper ends for convergent and divergent swinging movement of the lower ends of said legs between extended and folded positions, locking means for said legs comprising in combination: a first latch member mounted on said body substantially on a vertical central axis thereof and spaced below the top thereof, said first latch member having an annular recess concentric with said axis whereby a member in said recess is constrained by the side walls thereof against movement outward of said axis; and a plurality of second latch members each positioned adjacent an inner side of, and connected to one of said legs, normally free of said first latch member when said legs are extended, and positioned to make common entry into said recess when said legs are folded to hold all of said legs in a folded position in which they are substantially mutually parallel.

6. In a foldable support of the class having a central body and a plurality of legs hinged thereto at their upper ends for convergent and divergent swinging movement of the lower ends of said legs between extended and folded positions, locking means for said legs comprising in combination: a plurality of first latch members each connected to one of said legs and positioned adjacent an inner side thereof whereby to move toward each other when said legs converge; and a second single latch member movably mounted on said body, spaced below the top thereof and normally out of engagement with said first latch members when said legs are extended, said second latch member being aligned with the path of swinging movement of said first latch members whereby to make common engagement with all of said first latch members when said legs are folded to hold all of said legs in a folded position in which they are substantially mutually parallel, said second latch member being further adapted to be moved manually selectively to simultaneously engage or disengage all of said first latch members whereby respectively, to secure said legs in folded position or to release said legs for unfolding movement thereof.

7. The construction of claim 6 further characterized by having spring means connected between said second latch member and body to urge said second latch member in an engaging direction and inclined surfaces on said first latch members positioned and adapted to make contact with said second latch member when said legs are folded inwardly whereby to move said second latch member against the urging of said spring to effect said locking engagement thereof.

8. In a foldable support of the class having a central body and a plurality of legs hinged thereto at their upper ends for convergent and divergent swinging movement of the lower ends between extended and folded positions, bracing and locking means comprising in combination: a plurality of struts having the inner ends thereof hingedly secured to a common member and an outer end of each hingedly secured to one of said legs for concurrent swinging movement of said legs and struts between a folded position in which said legs and struts are substantially parallel with said struts lying inside of said legs and an extended position in which said legs are inclined and said struts are substantially in a common horizontal plane; a first latch member mounted on said body substantially on a vertical central axis thereof and spaced at a substantially fixed distance below the top thereof, said first latch member being independent of, and disconnected from said struts during the aforesaid swinging movement thereof; and a plurality of second latch members one fixed to each of said struts, free of said first latch member when said legs are extended, and positioned to make common engagement with said first latch member when said legs are folded to hold said struts and legs in said folded position, said first and second latch members being adapted for simultaneous relative movement with respect to each other to effect simultaneous release of said second members.

9. In a foldable support of the class having a central body and a plurality of legs hinged thereto at their upper ends for convergent and divergent swinging movement of the lower ends between extended and folded positions, bracing and locking means comprising in combination: a vertical central post secured to said body and extending downwardly therefrom; a member slidably mounted on said post for vertical adjustment therealong; a plurality of struts having the inner ends thereof hingedly secured to said member and an outer end of each hingedly secured to one of said legs for concurrent swinging movement of said legs and struts between a folded position in which said legs and struts are substantially parallel and an extended position in which said legs are inclined and said struts are substantially in a common horizontal plane; clamp means mounted on said member to secure the same to said post in any adjusted position thereof whereby to secure said legs in their then inclined position; a first latch member mounted on said central post adjacent the lower end thereof; and a plurality of second latch members, each connected to one of said legs adjacent an inner side thereof and, free of said first latch member when said legs are extended, and positioned to make common engagement with said first latch member when said legs are folded to hold said legs in said folded position, said first and second latch members being adapted for simultaneous relative movement with respect to each other to effect simultaneous release of said second members.

10. In a foldable support of the class having a central body and a plurality of legs hinged thereto at their upper ends for convergent and divergent swinging movement of the lower ends of said legs between extended and folded position, a leg assembly comprising in combination: an inverted A-shaped frame having an axial bore formed in the lower juncture end thereof and aligned transverse hinge bearings in the upper spaced ends thereof for connection to said body, said bore having a window cut through an outer wall thereof; a tubular leg slidably received in said bore for telescoping adjustment therein, said leg having a longitudinal flat along one side thereof and a linear scale marked along the length thereof, said scale being positioned under said window whereby to be viewed therethrough; a flat seat formed in the interior surface of said bore intermediate the ends thereof; a flat key member in said seat aligned with said flat to prevent rotation of said leg in said bore; clamp means in said bore to secure said leg in any adjusted position thereof; a plug-shaped member secured in the lower end of said leg and having a bifurcated extension with transverse pivot bearings formed therein, said pivot bearings being aligned on an axis parallel to said hinge bearings; a member having a ground-engaging spur therein and being mounted in said transverse pivot bearings for swinging movement to retract said spur or extend the same into ground-engaging position, said spur member having a second pivot mounted therein substantially perpendicular to said first pivot bearings; and a pad having a flat, ground-engaging surface mounted on said second pivot for limited lateral tilting movement with respect to said spur member, the relation of said spur and pad being such that one is always in retracted position when the other is in a ground-engaging position.

11. In a support structure of the class having a plurality of legs secured together at their upper ends, a foot structure for each of said legs comprising: a member having a ground engaging projection formed therein, said member being pivotally secured to the lower extremity of said leg for swinging movement in a vertical plane of said leg between retracted and ground engaging positions; and a pad having a flat ground engaging surface pivotally secured to said member for swinging movement in a plane intersecting said first plane, the relative positions of said projection and surface being such that one is always in retracted position when the other is in ground engaging position.

12. A foot structure for a tripod leg comprising in combination: a first member having a ground engaging projection and being adapted for connection to the lower end of a tripod leg for pivotal movement of said member about a first axis intersecting a plane through said leg; and a second member having a flat ground engaging surface and being connected to said first member for pivotal movement about a second axis intersecting a plane through said first axis whereby to permit self adjustment of said surface to be horizontal when said leg is inclined, said projection and surface being relatively positioned to face in divergent directions from said first axis whereby said projection and surface may be selectively placed in ground engaging positions by swinging said first member about said first axis.

13. In a foldable support of the class having a central body and a plurality of legs hinged thereto at their upper ends for convergent and divergent swinging movement of the lower ends of said legs between extended and folded positions, locking means for said legs comprising in combination: a first latch member mounted on said body substantially on a vertical central axis thereof, spaced below the top thereof, and movable between latching and unlatching positions; a plurality of second latch members each connected to one of said legs and positioned adjacent an inner side thereof to make common engagement with said first latch member to hold all of said legs in a folded position in which they are substantially mutually parallel; and spring means connected between said body and first latch member to urge the latter toward said latching position thereof.

14. The construction of claim 13 further characterized in that said second latch members having inclined surfaces formed thereon to engage said first latch member as said legs are folded to move said first latch member against the urging of said spring as said legs are folded.

15. In a foldable structure of the class having a body, and a plurality of legs hinged thereto at their upper ends for convergent and divergent swinging movement of the lower ends of said legs between extended and folded positions, locking means for said legs comprising in combination: a vertical central post fixed to said body and extending downwardly therefrom; a first latch member mounted for limited latching movement on said post adjacent the lower end thereof, said first latch member being disconnected from said legs during the aforesaid swinging movement thereof; and a plurality of second latch members independent of each other and each connected to one of said legs and positioned adjacent an inner side thereof to make common engagement with said first latch member to hold all of said legs in a folded position in which they are substantially mutually parallel.

BRUCE H. DALTON.

References Cited in the file of this patent
UNITED STATES PATENTS

| Number | Name | Date |
| --- | --- | --- |
| 619,659 | Bennetto | Feb. 14, 1899 |
| 821,335 | Butler | May 22, 1906 |
| 898,374 | Jessen | Sept. 8, 1908 |
| 937,612 | Kircher | Oct. 19, 1909 |
| 1,495,458 | Thalhammer | May 27, 1924 |
| 1,650,747 | Thalhammer | May 29, 1927 |
| 1,863,761 | Neuwirth | June 21, 1932 |
| 1,973,226 | Rose et al. | Sept. 11, 1934 |
| 2,282,285 | Olson | May 5, 1942 |